Nov. 4, 1930.  B. A. LINDERMAN  1,780,199
FLUID PRESSURE OPERATED DEVICE
Filed June 22, 1925  2 Sheets-Sheet 1

Inventor:
Bert A. Linderman
By Munday, Clarke & Carpenter
Attys

Nov. 4, 1930.     B. A. LINDERMAN     1,780,199
FLUID PRESSURE OPERATED DEVICE
Filed June 22, 1925     2 Sheets-Sheet 2

Inventor
Bert A. Linderman

Patented Nov. 4, 1930

1,780,199

UNITED STATES PATENT OFFICE

BERT A. LINDERMAN, OF NEW YORK, N. Y., ASSIGNOR TO LINDERMAN & CO., OF WILMINGTON, DELAWARE, A CORPORATION OF DELAWARE

FLUID-PRESSURE-OPERATED DEVICE

Application filed June 22, 1925. Serial No. 38,704.

My invention relates to fluid pressure operated devices adapted to control the relation of two relatively movable members preferably mounted on the same shaft and which fluid operated means determines whether or not one of these members rotates with respect to the other member or remains stationary with respect to the other member. One of the objects of my invention resides in the provision of certain improvements in construction and arrangement of the parts whereby only a relatively slight movement of the fluid pressure operating devices is required to determine whether or not the two members shall be relatively movable or relatively stationary.

Another object of my invention resides in the provision of mechanism in which ready adjustment of certain of the parts may be obtained to vary the operation thereof in accordance with the particular conditions of service. Yet another object of my invention resides in providing a fluid operated mechanism of the above character wherein one of the members has directly mounted upon it a plurality of deflatable members hermetically connected to an inflatable member to form a closed fluid containing system.

Numerous other objects and advantages of the invention will be apparent as it is better understood from the following description, which, taken in connection with the accompanying drawings, discloses a preferred embodiment thereof.

For the purpose of illustrating one embodiment of my invention I have shown and described it as constructed in the form of a clutch consisting of outer and inner concentrically disposed members provided with fluid pressure mechanism for determining whether the inner member will rotate relatively to the outer member or whether it will be clutched to remain relatively at rest with respect to the outer member.

Referring to the drawings.

Figure 1:
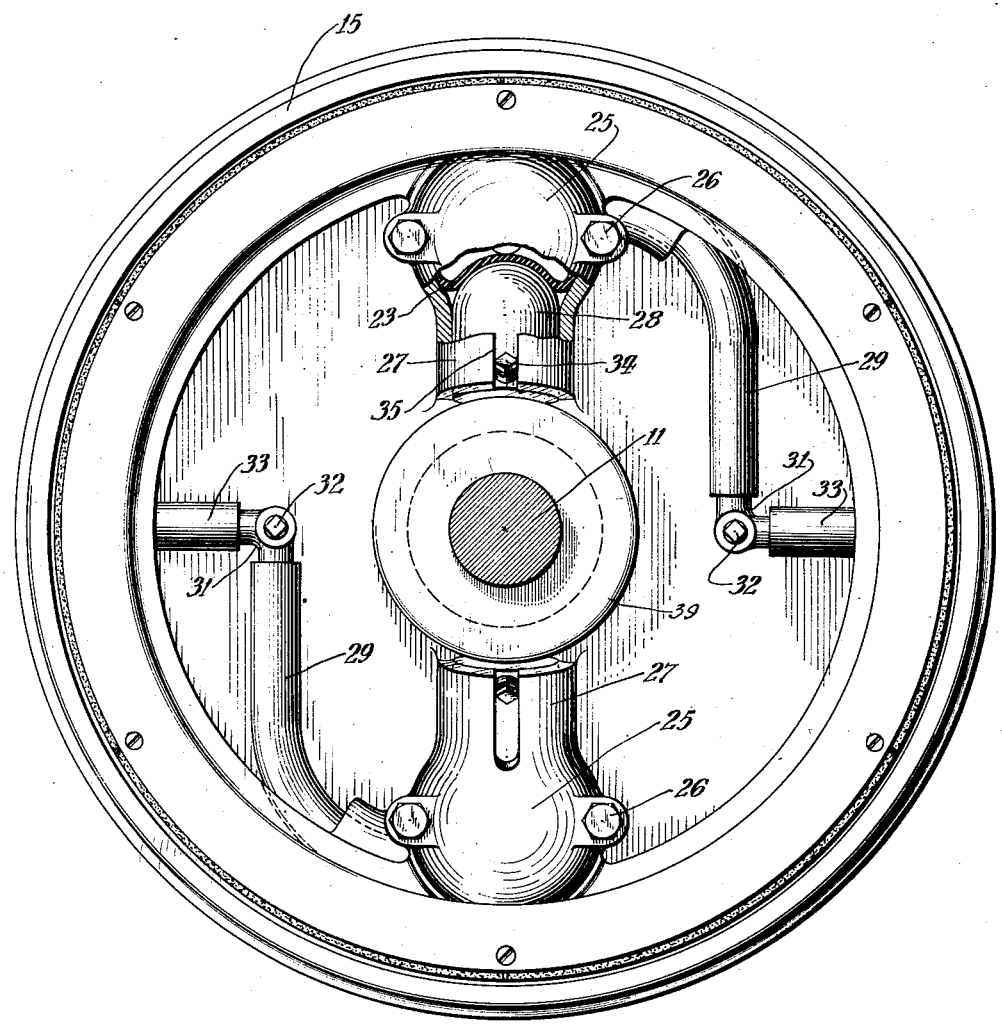
Figure 1 is an elevational view, partially broken away and shown in section, of a clutch in which my invention is embodied.
Figure 2:
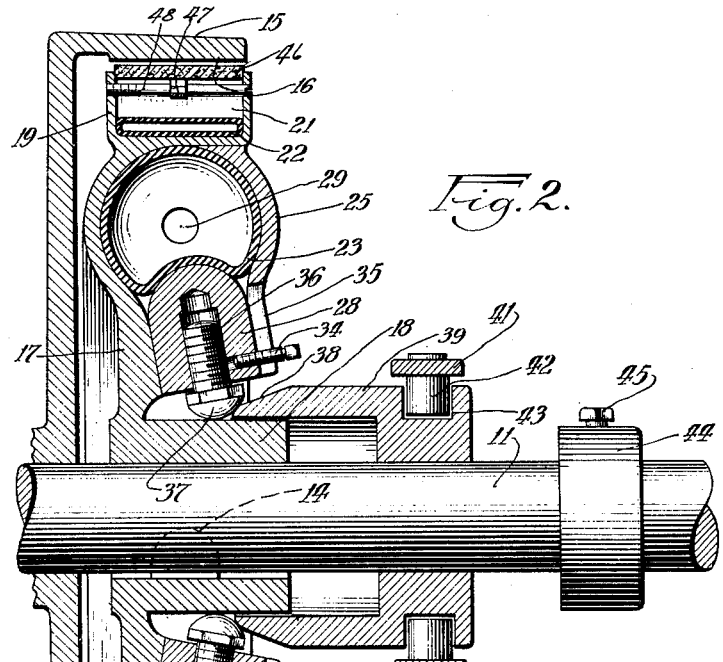
Fig. 2 is a cross-sectional view thereof, showing the position of the parts when the clutch is disengaged.
Figure 3:
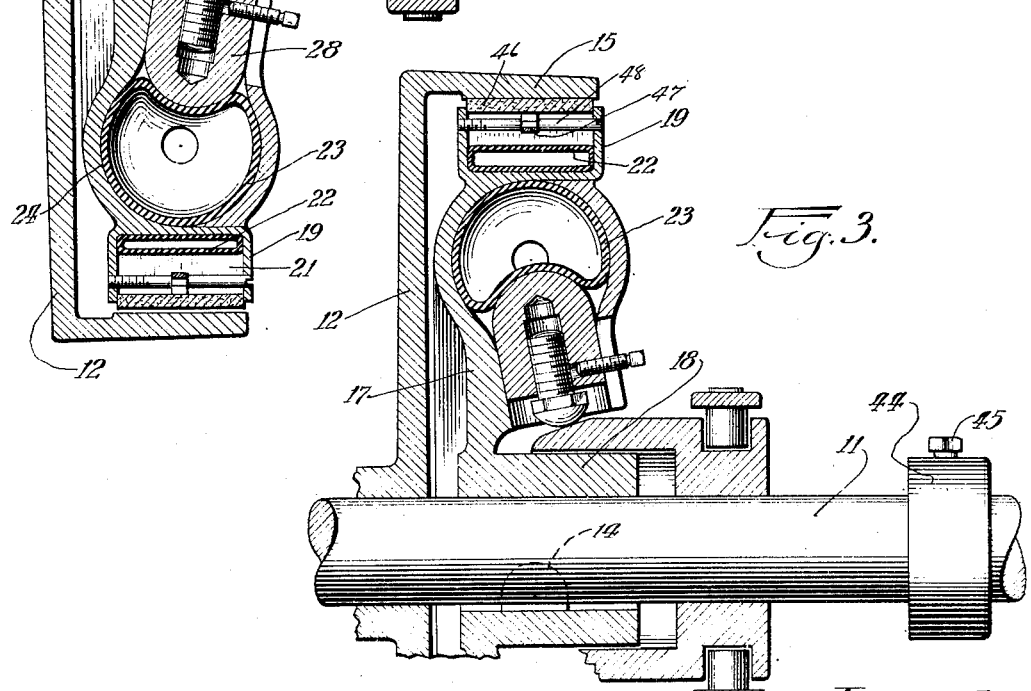
Fig. 3 is a similar view, partially broken away and showing the clutch engaged.

On said drawings, I have shown, for illustrative purposes only, a preferred form of my invention, in which the reference character 11 indicates a shaft, having a drum 12 loosely mounted thereon, and a driving element keyed thereto at 14. Said drum 12 has a peripheral flange 15, having an inner friction surface 16 disposed exteriorly of the driving element and adapted to be engaged by radially movable friction members of said element, as will be hereinafter more fully described. Said element comprises a main body, or casting, 17, having a hub part 18 and an outer channel portion 19 adapted to support radially movable segments 21 and an inflation comprising an elongated compartment 22 and an interconnected portion providing a chamber 23 communicating with the compartment 22, said inflation forming a flexible fluid container, the portions 23 being disposed in housings provided by a concave portion 24 of the casting 17 and a cap member 25 secured thereto by screws 26, the lower part of said casting being shaped to provide a cylinder 27, in which is disposed a piston or plunger 28 adapted to be actuated to expel the pressure medium from said container 23 into the inflatable tube 22 to engage the elements of the clutch. As will be apparent from an inspection of Figs. 1 and 2, I have shown, in the present instance, two of the fluid pressure control units just described, though it will be understood that a single one, or more than two of said units, might be provided, if preferred.

Said container 23 may be of rubber, or rubberized material, and has a tube 29 extending therefrom and connected by an elbow 31 secured to the casting 17 at 32 with a short tube 33 extending through the base of the channel 19 and communicating with the inflatable tube 22.

Said piston 28 has a guiding screw 34 extending laterally therefrom and disposed in a groove 35 in the cylinder 27, and an adjusting screw 36 is threaded into the body of said piston and extends outwardly from the end thereof, said screw having a rounded head 37 adapted to be acted upon by a conical end portion 38 of a slidable collar 39, mounted on the shaft 11 and adapted to be actuated through any suitable mechanism by means of a bifurcated lever 41, having studs 42 disposed in a circular groove 43 in said collar. A collar 44 is fixed to the shaft by means of a screw 45 and provides a stop for the collar 39.

The flexible container 23 is in the form of a ball and is adapted to have a diaphragm action when compressed by the plunger 28, as in the device of my U. S. Patent No. 1,690,543.

The segments 21 are provided with friction lining 46, of asbestos, raybestos, or the like, and springs 47, mounted upon screws 48 extending through the walls of the channel 19, are employed to hold said segments normally in retracted position.

It will be evident that only a short stroke of the member 39 is required to operate the diaphragms 23 with an effective action and inasmuch as said member acts directly upon the screw 36 of the piston 28, very few parts are required, the structure being, therefore, inexpensive to manufacture, as well as efficient in operation.

It is thought that the invention and many of its attendant advantages will be understood from the foregoing description, and it will be apparent that various changes may be made in the form, construction and arrangement of the parts without departing from the spirit and scope of the invention, or sacrificing any of its material advantages, the form hereinbefore described being merely a preferred embodiment of the invention.

I claim:

1. A fluid pressure operated device comprising a first transmission element, a second transmission element angularly movable with respect to said first element, movable means associated with one of said elements for effecting a power transmitting connection with the other, actuating means for said movable means comprising a closed hollow member having an inflatable and a depressible part, and adapted to contain a fluid pressure medium, said member being carried by the element with which said movable means is associated, a plunger adapted to act substantially radially upon said depressible part and an axially slidable actuating member operating on said plunger.

2. A fluid pressure mechanism comprising two members concentrically disposed about an axis for rotation and capable of relative angular movement, movable means for effecting gripping engagement between said members, said movable means including inflatable and compressible portions communicably interconnected and sealed to form a closed system containing a fluid pressure medium, a plunger for partially deflating one of said portions said plunger having a threaded bore, a threaded bolt adjustably screwing into said bore said bolt having a head and a wedge-like member adapted to operate on the head of said bolt to force said plunger towards said compressible portion.

3. In a fluid pressure operated device comprising a pair of concentrically disposed members mounted for relative angular movement about a common axis, one of said members having an annular portion and said other member carrying shiftable shoes within said annular portion and in position to engage said portion, an inflatable member carried in said other member behind said shiftable shoes to project the same radially upon inflation, radially movable plungers carried in said other member behind said inflatable member in position to compress portions thereof upon projection, and means for projecting said plungers.

4. A fluid pressure mechanism comprising a pair of elements mounted for relative angular movement about a common axis, means carried by one of said elements to form a driving connection between said elements whereby to resist said relative angular movement and means including an inflatable member for actuating said last mentioned means, said inflatable member having a compressible inwardly extending portion means including a radially movable plunger for compressing said compressible portions whereby to expand other portions of the inflatable member for actuating said first mentioned means, and means for adjusting the travel of said radially movable plunger.

5. A fluid pressure mechanism comprising a shaft, a pair of transmission elements mounted to said shaft for relative rotation, movable means associated with one of said elements for preventing relative rotation of said elements, actuating means for said movable means including communicably connected inflatable and compressible portions adapted to contain a fluid pressure medium and carried by the said element with which the movable means is associated, a radially movable plunger adapted to act upon said compressible portion and formed to provide a cam following portion, and a cam slidably mounted to said shaft and adapted to cooperate with said cam following portion whereby to actuate the plunger.

BERT A. LINDERMAN.